US008126199B2

(12) United States Patent
Wu et al.

(10) Patent No.: US 8,126,199 B2
(45) Date of Patent: *Feb. 28, 2012

(54) IDENTIFICATION OF FAULTY JETS VIA SENSING ON CUSTOMER IMAGES

(75) Inventors: Wencheng Wu, Webster, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 475 days.

This patent is subject to a terminal disclaimer.

(21) Appl. No.: 12/474,711

(22) Filed: May 29, 2009

(65) Prior Publication Data

US 2010/0303281 A1 Dec. 2, 2010

(51) Int. Cl.
*G06K 9/00* (2006.01)
*B41J 2/205* (2006.01)

(52) U.S. Cl. .......................... 382/100; 347/15; 382/162

(58) Field of Classification Search ................. 382/100, 382/112, 162, 167, 266; 347/12, 14, 15, 347/19, 43; 358/1.1, 1.4, 1.9, 504, 518–523; 348/453–459; 345/589–605; 250/559.05–559.11
See application file for complete search history.

(56) References Cited

U.S. PATENT DOCUMENTS 5,767,876 A * 6/1998 Koike et al. .................... 347/43
6,354,689 B1 * 3/2002 Couwenhoven et al. ....... 347/19
6,739,699 B1 * 5/2004 Sender et al. .................. 347/43
7,377,613 B2 * 5/2008 Yamazaki et al. ............. 347/19

OTHER PUBLICATIONS

Wu et al., U.S. Appl. No. 12/018,540, filed Jan. 23, 2008.
Mizes et al., U.S. Appl. No. 12/177,532, filed Jul. 22, 2008.

* cited by examiner

*Primary Examiner* — Samir Ahmed
*Assistant Examiner* — Mehdi Rashidian
(74) *Attorney, Agent, or Firm* — Oliff & Berridge, PLC

(57) ABSTRACT

Systems and methods monitor jets in a color imaging device to identify and correct faulty jets without interrupting a print job. The relationship between the output of the imaging device and the sensor values of a sensor is characterized in a correspondence table. Thereafter, an image produced by the imaging device is measured by the sensor at multiple locations for a group of jets including jets each corresponding a different color of the imaging device color space. The measured output at each of the multiple locations is compared with two or more sets of predicted sensor outputs generated from the color coordinates used to produce the image at the corresponding location and the correspondence table, the set of predicted sensor outputs including at least one predicted sensor output generated with at least one jet set as faulty. At least one jet is determined as operating properly or being faulty based on a comparison of the sets of predicted sensor outputs and the corresponding measured outputs for the multiple locations.

20 Claims, 12 Drawing Sheets

| DATA COLLECTED VIA SENSING & ANALYZING ON CUSTOMER IMAGES | | | | | | | PREDICTED SENSOR RESPONSES FOR ALL 16 POSSIBLE MODES BASED ON INTENDED cmyk AND CHARACTERIZED PRINTER-SENSOR RELATIONSHIP | | | | | | |
|---|---|---|---|---|---|---|---|---|---|---|---|---|---|
| SPATIAL LOCATION | | INTENDED COLOR | | | | MEASURED GRAY-LEVEL | PREDICTED ALL-ON | PREDICTED c-MISSING | PREDICTED m-MISSING | PREDICTED y-MISSING | PREDICTED k-MISSING | ... | PREDICTED ALL-MISSING |
| x | y | c | m | y | k | g | g0 | g1 | g2 | g3 | g4 | ... | g15 |
| 1 | 1 | 100 | 10 | 100 | 0 | 22 | 23 | 119 | 23 | 66 | 23 | | 221 |
| 1 | 2 | 70 | 10 | 40 | 10 | 59 | 57 | 127 | 57 | 87 | 71 | | 221 |
| 1 | 3 | 30 | 55 | 100 | 0 | 59 | 61 | 87 | 86 | 126 | 61 | | 221 |
| 1 | 7 | 10 | 20 | 0 | 0 | 186 | 186 | 198 | 208 | 186 | 186 | | 221 |
| 1 | 8 | 100 | 10 | 0 | 0 | 67 | 66 | 204 | 64 | 66 | 66 | | 221 |
| 10 | 2 | 20 | 40 | 70 | 10 | 98 | 74 | 98 | 94 | 113 | 87 | | 221 |
| 10 | 100 | 70 | 100 | 20 | 40 | 42 | 25 | 43 | 41 | 26 | 39 | | 221 |
| . | . | . | . | . | . | . | . | . | . | . | . | . | . |
| . | . | . | . | . | . | . | . | . | . | . | . | . | . |
| . | . | . | . | . | . | . | . | . | . | . | . | . | . |

A

B

FIG. 7

IDENTIFICATION OF FAULTY JETS VIA SENSING ON CUSTOMER IMAGES

BACKGROUND

This disclosure generally relates to systems and methods for detecting non-functional and dysfunctional jets in a color imaging device.

As used herein, the term "process direction" is defined as the direction of movement of recording media through an image rendering device such as a printer. The term "process-perpendicular direction" is defined as the direction perpendicular to the process direction. The terms "missing jet" or "faulty jet" are defined as a jet that is not properly operating, including jets that are non-functioning or dysfunctioning. That is, a missing or faulty jet is a jet that does not properly expel the amount of ink that it should expel.

Detection, and the subsequent correction, of faulty jets ensure the production of quality images by color image rendering devices. There are various existing approaches for detecting faulty jets in color image rendering devices such as printers. One way to detect dysfunctioning or non-functioning jets is to perform visual inspection of printed output to detect visual defects resulting from the improper operation of the dysfunctioning or non-functioning jets. For example, dysfunctioning or non-functioning jets may produce "streaks" in the color printed output that can be detected by an observer. However, visual inspection is not sufficient to detect all dysfunctioning or non-functioning jets. For example, visual inspection may not determine faulty jets that correspond to colors that form a low percentage of an image, as compared with other jets. Further, visual detection of faulty jets is not always practical in continuous printing environments without stopping the printing process. Thus, there is a need for automated detection of faulty jets that can be performed without stopping a user's continuous printing process. Further, there is a need for detection of faulty jets that can successfully detect faulty jets even when the colors corresponding to the faulty jets are not dominant in the printed output.

SUMMARY

Being able to continuously identify faulty jets during print runs while eliminating or minimizing interruptions or disruptions to ongoing print jobs, such as to print test patterns, is critical for continuous-feed imaging processes.

U.S. patent application Ser. No. 12/018,540 to Wu et al., filed Jan. 23, 2008 and entitled "Systems And Methods For Detecting Image Quality Defects", provides a method for continuous identification of missing jets during print runs. This approach uses a three-channel color sensor for measuring printed colors in L*a*b* color space and includes sensing user images to identify defects in the response as missing/faulty jet candidates. The disclosure of U.S. patent application Ser. No. 12/018,540 is hereby incorporated by reference in its entirety herein.

U.S. patent application Ser. No. 12/177,532 to Mizes et al., filed Jul. 22, 2008 and entitled "Systems and Methods For Monitoring Jets with Full Width Array Linear Sensors", provides another method for continuous identification of missing jets during print runs. This approach includes sensing user images and using an isoplot of accumulated linear array response vs. accumulated number of drops ejected to identify outliers in the response as missing/faulty jet candidates. This approach uses a monochromatic sensor, and thus the approaches of Wu et al., which uses a three-channel sensor for measuring the colors in L*a*b* color space, are not applicable. Instead, U.S. patent application Ser. No. 12/177,532 utilizes only customer image portions that have a dominant separation in which one color is dominant. That is, this approach only senses user images (or portions of user images) that are dominated by one color of the imaging device's color space. This limits usage of this approach because not all user images will have portions dominated by a single color, and thus not all user images can be used in detecting faulty jets. That is, in print runs in which there are no dominant separations, this approach may fail to detect some or all jets that are faulty, or may falsely detect operating jets as missing, for example, as a result of noise. The disclosure of U.S. patent application Ser. No. 12/177,532 is hereby incorporated by reference in its entirety herein.

Improved methods for detecting dysfunctional or non-functional jets during continuous printing operations and that can be applied to a more general selection of user images are disclosed herein.

One method of monitoring jets is used with a color imaging device, in which the jets respectively output inks of different colors, and in which the imaging device includes a monochromatic sensor that senses images output by the imaging device. The method includes generating a correspondence map between an output color space of the jets and an output gray scale space of the monochromatic sensor. Actual gray scale values of an image output by the imaging device are measured at multiple locations, the image having been generated from actual image data. Then, predicted gray scale values of the monochromatic sensor are calculated for each of the multiple locations, the predicted gray scale values for each of the multiple locations including predicted gray scale values for multiple different possible operating configurations of the jets, wherein each jet can have an operating state of (i) properly operating or (ii) faulty. The different operating configurations include different combinations of properly operating and faulty jets for a predetermined group of the jets, each jet of the predetermined group outputting a different one of the different colors. The method also includes determining whether the jets are (i) operating properly or (ii) faulty, by comparing the measured actual gray scale values of the multiple locations with the corresponding predicted gray scale values for each of the multiple locations.

The correspondence map may be generated based on sensing at least one test patch output by the color imaging device.

The step of generating a correspondence map may include purging all the jets of at least one group of jets comprising one jet of each of the different colors; printing a plurality of test patches by the purged at least one group of jets, each of the test patches being printed from a different set of test patch color coordinates; sensing the test patches by the monochromatic sensor to generate corresponding gray scale values; and storing the sensed gray scale values each with the test patch color coordinates used to print the corresponding test patch.

The step of generating a correspondence map may include printing a plurality of test patches by a plurality of jet groups each including one jet for each of the different colors, each test patch being printed from a set of test patch color coordinates, each set of test patch color coordinates being printed by multiple jet groups of the plurality of jet groups; sensing the test patches by the monochromatic sensor, the monochromatic sensor outputting sensed gray scale values; averaging the sensed gray scale values for test patches printed by different jet groups from a same one of the sets of test patch color coordinates to generate averaged gray scale values; and storing each set of test patch color coordinates used to print the test patches with the corresponding averaged gray scale value.

The step of determining whether the jets are (i) operating properly or (ii) faulty, may be made based on a best match between the measured actual gray scale value and the corresponding predicted gray scale values for each of the multiple locations.

The step of determining may include determining, for each of the multiple locations, which operating configuration has a predicted gray scale value having a best match with the corresponding actual measured gray scale value.

The determination of whether any jets are faulty may be carried out at predetermined intervals. The method may further include indicating the results of the determination of whether a jet is operating properly or is faulty for at least one jet. The method may further include performing a cleaning/purging operation if one or more jets is determined to be faulty.

The method may further include tiered classification in which, first, a predicted operating state for each jet of a jet group having one jet for each of the different colors is set to properly operating. Second, a color of one of the jets of the jet group that has not previously been set as a target color is set to be the target color. Predicted gray scale outputs for the multiple locations for the jet group are determined wherein the predicted operating state of the jet of the target color is alternately (i) operating properly and (ii) faulty for different predicted gray scale output sets. Third, whether the jet of the target color is operating properly or is faulty is determined by comparing the predicted gray scale outputs with the actual gray scale outputs for the multiple locations. Fourth, the predicted operating state of the jet of the target color is set according to the results of the third step of determining. Fifth, when at least one of the colors of the jets of the jet group has not been set as the target color, repeating the second to fifth steps.

Another method of monitoring jets of a color imaging device is disclosed wherein the jets respectively output inks of different colors and the imaging device includes a multichromatic sensor that senses images output by the imaging device. The method includes generating a correspondence map between an output color space of the jets and an output color space of the multichromatic sensor, and measuring actual color values of an image output by the imaging device at multiple locations, the image generated from actual image data. The method further includes calculating predicted color values of the multichromatic sensor for each of the multiple locations, the predicted color values for each of the multiple locations including predicted color values for multiple different possible operating configurations of the jets, wherein each jet can have an operating state of (i) properly operating or (ii) faulty, the different operating configurations comprising different combinations of properly operating and faulty jets for a predetermined group of the jets, each jet of the predetermined group outputting a different one of the different colors. The jets are determined to be (i) operating properly or (ii) faulty by comparing the measured actual color values of the multiple locations with the corresponding predicted color values for each of the multiple locations.

A system also is disclosed herein for monitoring jets in a color imaging device, the jets each corresponding to different ones of a plurality of colors of the color imaging device. The system includes a sensor that senses images and outputs actual gray scale values, a memory storing a correspondence map between an output color space of the jets and an output gray scale space of the sensor, and a processing device. The processing device controls the sensor to measure printed output of the color imaging device at multiple locations in the printed output and to output corresponding actual gray scale values. The processing device also calculates predicted gray scale values of the sensor for each of the multiple locations, the predicted gray scale values for each of the multiple locations including predicted gray scale values for multiple possible operating state configurations of the jets, wherein each jet can independently have the operating states of properly operating and faulty. The processing device also determines, for a predetermined group of jets, having jets each of which corresponds to a different one of the plurality of colors, the operating states of the jets based on the predicted gray scale values and the actual gray scale values for the multiple locations.

The processing device further controls jets of the color imaging device to produce test patches from test patch color coordinates and stores each of the test patch color coordinates in association with the corresponding actual gray scale value output by the sensor.

The system may further include an interface that allows a user to specify which jets are to be monitored. The system may further include a display that indicates the determined operating state for at least one jet.

The processing device may determine the operating states of the jets based on a best match between the measured actual gray scale values and the corresponding predicted gray scale values for each of the multiple locations.

The best matches may be determined by at least one of a minimum mean squared error and a minimum p-norm error between the actual gray scale values and the corresponding predicted gray scale values for the multiple locations. The monitoring of the jets may be carried out at predetermined intervals.

The processing device may (1) set a predicted operating state to properly operating for each jet of a jet group having one jet for each of the plurality of colors; (2) select a color of the plurality of colors that has not yet been set as a target color to be set as the target color, and calculate predicted gray scale values for the multiple locations for the jet group, wherein the predicted operating state of the jet of the target color is alternately (i) operating properly and (ii) faulty, the processing device determining whether the jet of the target color is operating properly or is faulty by comparing the predicted gray scale values with the actual gray scale values for the multiple locations; (3) set the operating state of the jet of the target color according to the results of the determination; and (4) when at least one color of the plurality of colors has not been set as the target color, repeat steps (2)-(4).

The system may further include a controller that causes jets determined to be faulty to be purged. Xerographic devices including the disclosed systems and methods also are disclosed herein.

BRIEF DESCRIPTION OF THE DRAWINGS

FIG. 7 is a table showing database entries for an example 1;

EMBODIMENTS

The disclosed systems and methods enable the monitoring of jets to detect non-functional and dysfunctional jets of a color imaging system. The disclosed approaches allow non-functional and dysfunctional jets to be detected and corrected based on an analysis of printed image data collected over time, across separate images, under a wide variety of system status and environmental conditions, including during normal printing operation, to allow detection of non-functional and dysfunctional jets that might otherwise be undetectable. The disclosed approaches have the advantage of not requiring the interruption of normal operation of the image printing device because the data collected can be collected from printed images produced during normal operation of an imaging device, such as during normal operation at a user site, and has the advantage of being applicable to a wide range of user images.

For color images, an image can be represented by a large number of pixels (picture elements), generally organized in rows and columns, each pixel having a color. The number of pixels per unit of linear measurement in either the row or column direction is termed the resolution. For example, a color image may have a resolution of 640 pixels per inch by 640 pixels per inch. To avoid the necessity to produce all possible colors of ink, it is known that a large number of perceivable colors can be reproduced by using a small number of colors combined in proper ratios. Common systems for reproducing colors include the CMYK system in which the colors cyan (C), magenta (M), yellow (Y), and black (K) are used; and the RGBK system in which the colors of red (R), green (G), blue (B), and black (K) are used, but any other suitable system can be used. The colors used by a printer, such as cyan, magenta, yellow, and black, define the color space of the printer.

Figure 1:
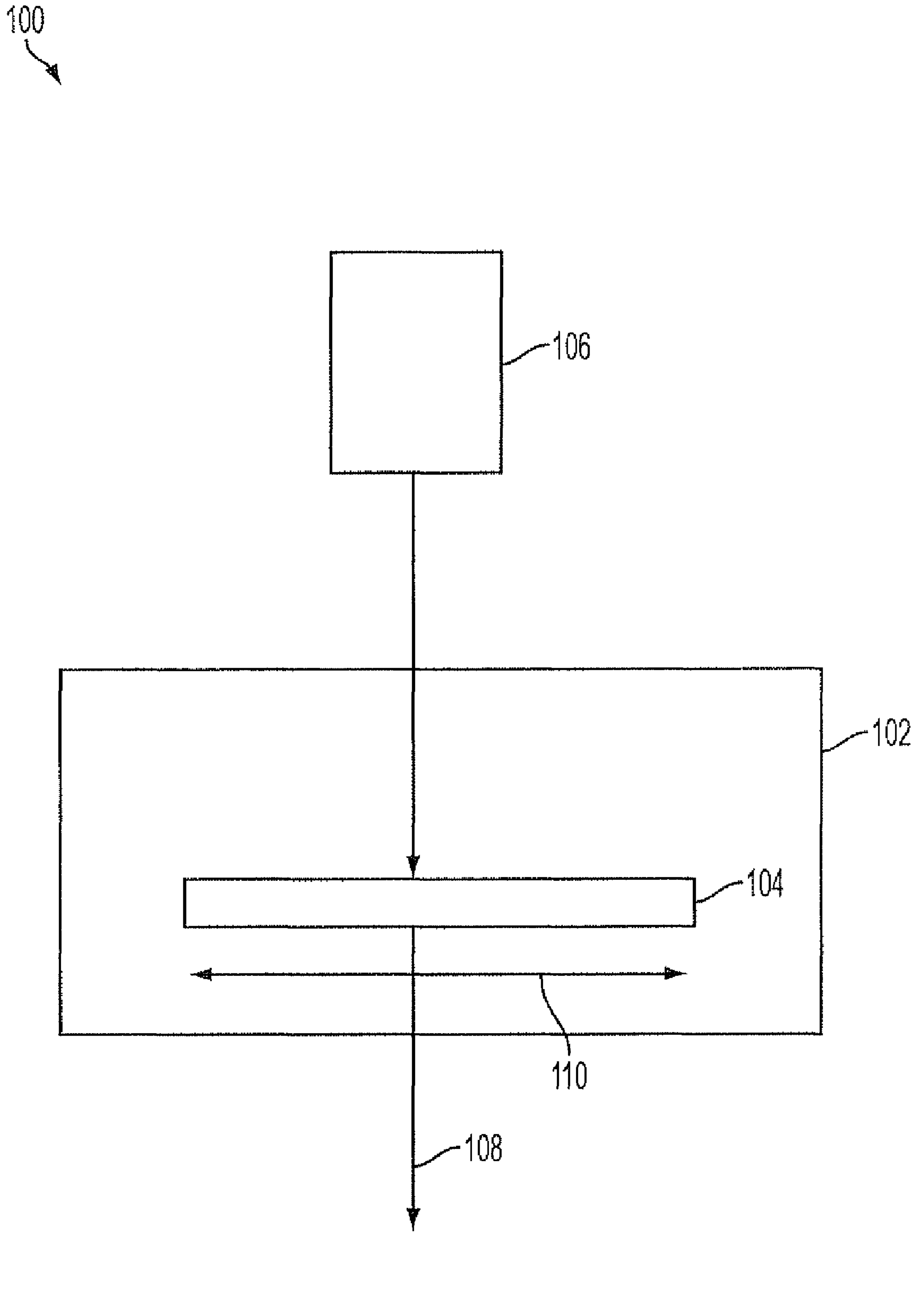
FIG. 1 is a schematic of a color imaging device.

FIG. 1 shows an image printing device (imaging device or printer) 100 having a body 102, a print head 104, a sheet or recording medium 106, a process direction 108, and a process-perpendicular direction 110. The process direction is the direction taken by the medium 106 as it passes the print head 104 to receive an image. The process-perpendicular direction 110 is perpendicular to the process direction 108. When print head 104 is movable, print head 104 will generally be movable back and forth in the process-perpendicular direction 110 so as to be able to print across the entire width of the printer 100's image printing range in the process-perpendicular direction 110.

Figure 2:
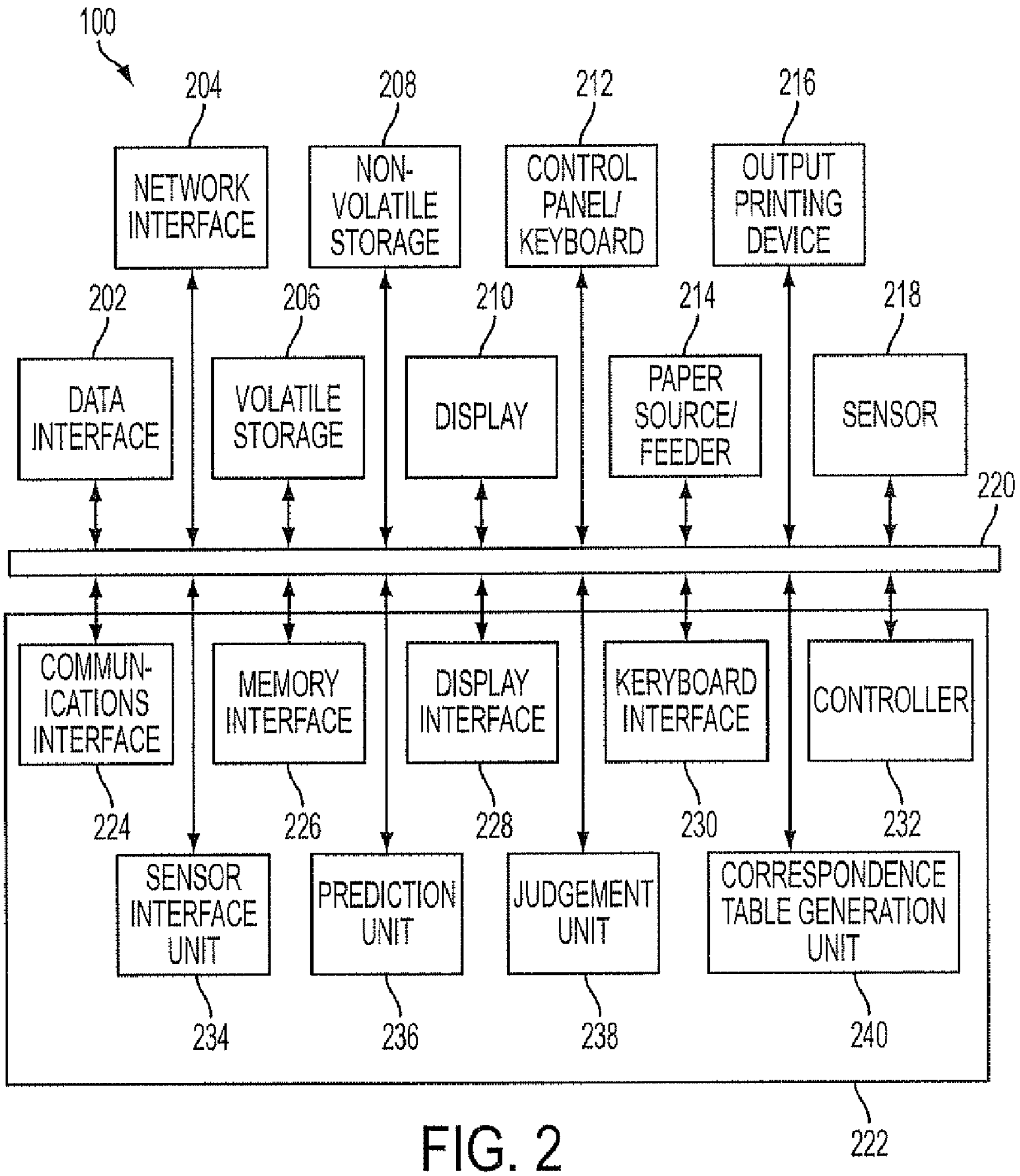
FIG. 2 is a block diagram of a color imaging device.

FIG. 2 shows a block diagram of printer 100 having a data interface 202, a network interface 204, volatile storage or memory 206, non-volatile storage or memory 208, a display 210, a control panel, keyboard, or set of buttons 212, a paper or recording medium source or feeder 214, an output image printing device 216, a sensor 218, a bus 220, and a processor 222. Processor 222 has a communications interface 224, a memory interface 226, a display interface 228, a control panel/keyboard interface 230, a controller 232, a sensor interface unit 234, a prediction unit 236, a judgment unit 238, and a correspondence table generation unit 240.

Data interface 202 can be any interface allowing printer 100 to communicate directly with an external device and can use any applicable communications protocols. For example, data interface 202 can be a Bluetooth interface, an RS232 interface, a parallel printer port interface, a firewire interface, a USB interface, or any other data communication interface. Data interface 202 allows printer 100 to communicate with an external device to receive image data for printing and/or to receive commands. Network interface 204 can be any interface allowing printer 100 to be networked with other devices and to communicate through the network with these devices and can use any applicable communications protocol. For example, network interface 204 can be an Ethernet interface, or any other network communication interface. Network interface 204 allows printer 100 to communicate with a networked device to receive image data for printing and/or to receive commands.

Volatile storage or memory 206 and non-volatile storage or memory 208 store print data and program instructions necessary for imaging device 100 to print images and further store the necessary instructions to implement the disclosed methods and systems. Additionally, in variations, a program or program modules implementing the disclosed algorithms can be stored on a portable computer readable storage medium such as a floppy disk, compact flash, removeable hard drive, USB storage device, or any other suitable computer readable storage device. In these variations, imaging device 100 can include a computer readable storage medium reading device such as a floppy disk reader, compact flash reader, USB reader, etc., or can be networked to an external device configured to read the portable computer readable storage medium. Display 210 and control panel, keyboard, or set of buttons 212 form a user interface to allow a user to interact with the imaging device 100. For example, control panel 212 can enable a user to initiate disclosed algorithms to monitor, detect, and/or correct faulty jets. Paper or recording medium source or feeder 214 provides the recording media 106 to the imaging device 100, and output image printing device 216 forms the images on recording media 106, respectively.

Sensor 218 is an optical sensor that measures printed output of the imaging device 100 and that outputs corresponding sensed values. Sensor 218 preferably is a monochromatic sensor (for example, a monochromatic CCD) that, when color images are output by printer 100, produces a gray scale value for each sensed part of the color image. Alternatively, the sensor 218 could be a color sensor that senses color images and outputs two or more color values in the color space of the sensor 218. For example, a color sensor 218 could have a RGB color space, a Lab color space, or a 400 nm~700 nm reflectance space. The imaging device 100 can include a single sensor 218, or there can be two or more sensors 218. Sensor or sensors 218 can be fixed in relation to the body 102 of the printer 100 or can be movably attached in the printer 100. If movably attached to printer 100, the sensor or sensors 218 will normally need to be moved to sense all the image parts desired to be sensed. Sensor or sensors 218 have the capability to sense single, independent pixels in printed output of the imaging device 100. That is, the resolution of the sensor(s) 218 preferably is at least as high as the resolution of the printer 100.

Processor 222 is a computer processing device able to execute computer processing to implement the disclosed functions. Processor 222 can be any computer processing device capable of implementing the functions disclosed herein. For example, processor 222 can be a central processing unit (CPU), an application specific integrated circuit (ASIC), or any other electronic device or circuitry capable of implementing the disclosed operations. Alternatively, or additionally, the processor 222 can be a distributed processing device with components distributed within the printer 100. Alternatively, or additionally, the processor 222 can be linked to a network, such as an intranet or the Internet, to cooperate with other components or processing devices external to the printer 100. Alternatively, or additionally, the printer 100 can have multiple processors 222 or can have one or more multi-core processors 222. Thus, the functionality disclosed for the processor 222 can be distributed between two or more processors 222, each of which can be implemented as described above.

Controller 232 controls the jets 304 (see FIG. 3) to expel inks as necessary to form images. If jets 304 are movable relative to the body 102, the controller 232 controls the position of the print head 302 (see FIG. 3) to position the jets 304 to print images. The sensor interface unit 234 enables the processor to communicate with the sensor or sensors 218. The prediction unit 236 and a judgment unit 238 allow the processor to implement the use of sensed image color values to determine whether any jets 304 are faulty. The correspondence table generation unit 240 interacts with the sensor interface unit 234 and the controller 232 to print and sense test patches or patterns to generate a correspondence table that characterizes the relationship between the colors in the images output by the imaging device 100 and the monochromatic values sensed by the sensor 218 when sensing the images output by the imaging device. Although controller 232, sensor interface unit 234, prediction unit 236, judgment unit 238, and correspondence table generation unit 240 are shown as part of processor 222, these units each can be implemented as separate units within printer 100 and, in variations, each can be implemented to comprise its own processor 222.

Figure 3:
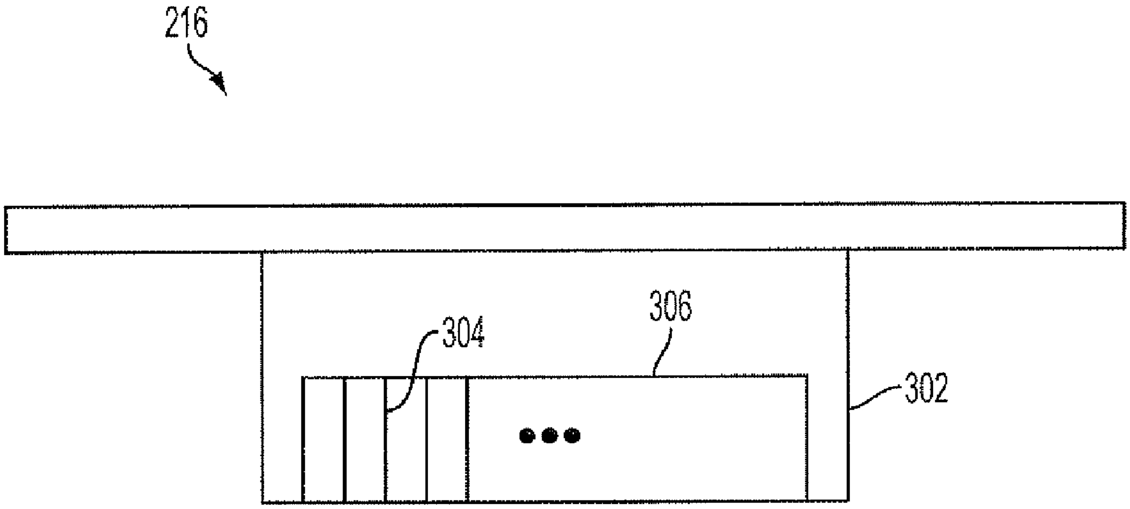
FIG. 3 is a schematic of a print head.

FIG. 3 shows the output image printing device 216 having a print head 302. Print head 302 has a plurality of jets 304 coupled to a manifold 306. Jets 304 each expel ink to form parts of images. For color printing, each jet 304 in printer 100 expels ink of one color of the color space of the printer 100. Because each jet 304 in color printing is generally dedicated to a single color of the printer 100, each pixel across the printing range of imaging device 100 in the process-perpendicular direction 110 must have a jet 304 for each color in the printer 100's color space to ensure that all possible colors printable by printer 100 can be achieved at each pixel. A jet set (or group of jets), as defined herein, is a group of jets 304 corresponding to a same pixel. Each jet 304 of a jet set corresponds to a different one of the colors in the printer 100's color space. For example, in the CMYK color space, a jet set will include four jets 304, one each for C, M, Y and K inks. In general, each jet 304 will have an associated nozzle out of which the ink is expelled, although in variations, a single nozzle can be shared between two or more jets 304 of a jet set. Further, the jets 304 can each have an associated heater to heat the ink before expulsion from the jet 304.

Jets 304 are attached to manifold 306 that can be in print head 302. The print head 302 can be fixedly or movably mounted to the body 102 of the printer 100. Generally, the jets 304 of a jet set will be provided in a line parallel to the process direction 108, but may be provided in any other suitable arrangement. Further, the configuration of different jet sets can be different. For example, alternate jet sets can have reversed configurations. The jet sets formed by jets 304 can be disposed along the process-perpendicular direction 110 in manifold 306 in any desired arrangement. For example, the jet sets can be disposed in manifold 306 in a line, a curvilinear line, a zig-zag fashion, or any other desired configuration. Controller 232 controls each of the jets 304 to expel the amount of ink required to print an image.

When print head 302 is fixedly mounted to body 102, there are sufficient jets 304 in manifold 306 to produce all pixels in the process-perpendicular direction 110 required by the resolution of the printer 100 across the entire printing range in the process-perpendicular direction 110. For example, if the maximum resolution of printer 100 is 1000 pixels per inch and the maximum width of an image that can be printed by the printer 100 is 10 inches, then the printer 100 will have the capability to print 10,000 pixels in the process-perpendicular direction 110. In this case, the printer 100 will have 10,000 jet sets. If the color space of the printer 100 is CMYK, for example, there will be four jets per pixel, resulting in a total of 40,000 jets in the printer 100 for this example.

When print head 302 is movably mounted to body 102, such as in a movable (carriage-type) printer, the print head 302 can be moved in the process-perpendicular direction 110 under the control of controller 232. When print head 302 is movable and the number of jet sets is less than the number of pixels printable by the printer 100 along the process-perpendicular direction 110, then print head 302 may have to be moved to enable all pixels along the process-perpendicular direction 110 to be printed. In this case, one or more jet set will be responsible for printing multiple pixels in a given row along the process-perpendicular direction 110. In this case, controller 232 controls the movement of the print head 302 along the process-perpendicular direction 110 and coordinates which jet sets are responsible for printing which pixels.

Operation

Figure 4:
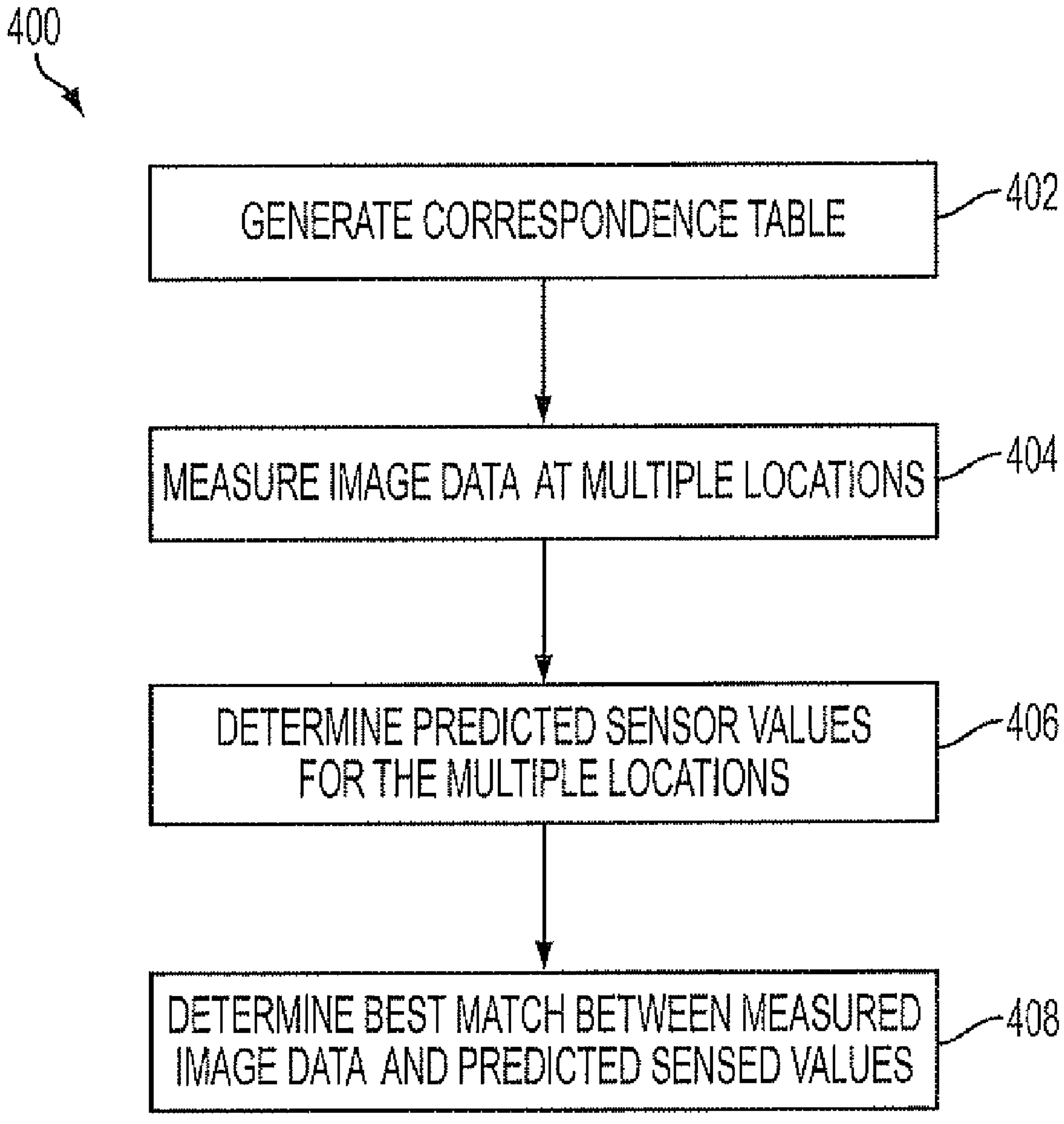
FIG. 4 is a flowchart for a method of monitoring jets of an imaging device.

FIG. 4 shows a flowchart for a method 400 of monitoring jets 304 of an imaging device 100. At step 402, the relationship between color images produced by the imaging device and monochromatic images sensed by the sensor 218 is characterized to produce a correspondence table that provides a correspondence between sets of color coordinates in the printer 100's color space and the corresponding gray-scale sensor output values of sensor or sensors 218. In this step, a set of test patches or patterns are printed and sensed by sensor 218 to produce sensor outputs. For the correspondence table to be properly generated, the images used should not be produced using faulty jets. The color coordinates used to print the test patterns are each stored with their corresponding gray-scale sensor values by the correspondence table generation unit 240. Thus, each set of color coordinates in the correspondence table is paired with a corresponding monochromatic gray-scale sensor output value if sensor 218 is monochromatic or with a corresponding set of color sensor output values if sensor 218 is a color sensor.

Although test patches corresponding to all different colors printable by printer 100, or measurable by sensor 218, can be printed, generally this option is not used because it would be excessively expensive and time consuming. Instead, generally, a set of test patches can be printed that represent or sample, at predetermined intervals, the colors capable of being printed by the printer 100. For example, if the color space of printer 100 is CMYK with the values of each of the C, M, Y and K colors being defined as 0 (no ink) to 255 (full saturation), test patches could be printed for all combinations of C, M, Y and K, wherein each of C, M, Y and K is varied by a predetermined amount. For example, using an interval of 8, each of the colors could be varied over the values 0, 8, 16, 32, 64, . . . 248, and 255 (255 is used as the last value because 256 is not an available value). Other strategies include: using smaller or larger intervals; using color samples only for portions of the entire output color space of the imaging device 100; using varying interval lengths, using different intervals for different colors, using different interval lengths for different colors; using different numbers of samples for some colors than others; etc.

Because the correspondence table characterizes the relationship between the output color images and the monochromatic (gray scale) sensed images, step 402 must be performed prior to carrying out the remainder of method 400. But once the correspondence table is created, step 402 does not need to be repeated each time method 400 is performed. Step 402 may be repeated when it is expected that the relationship between the color image output and the sense image will have changed, such as after a predetermined time, for example one year; after a predetermined number of pages have been printed, for example 500,000; after servicing of the imaging device 100; after replacement or servicing of sensor 218; after replacement or servicing of print head 302, etc. Additionally, step 402 can be performed as part of a calibration procedure; as a standard part of maintenance; etc. Step 402 can be performed in several ways. In an embodiment, a partial update is carried out, where for example, only a small portion (include some predetermined critical colors or colors from customer documents) of the full set of test patches is updated. Based on this update, a full update can be scheduled.

Figure 5:
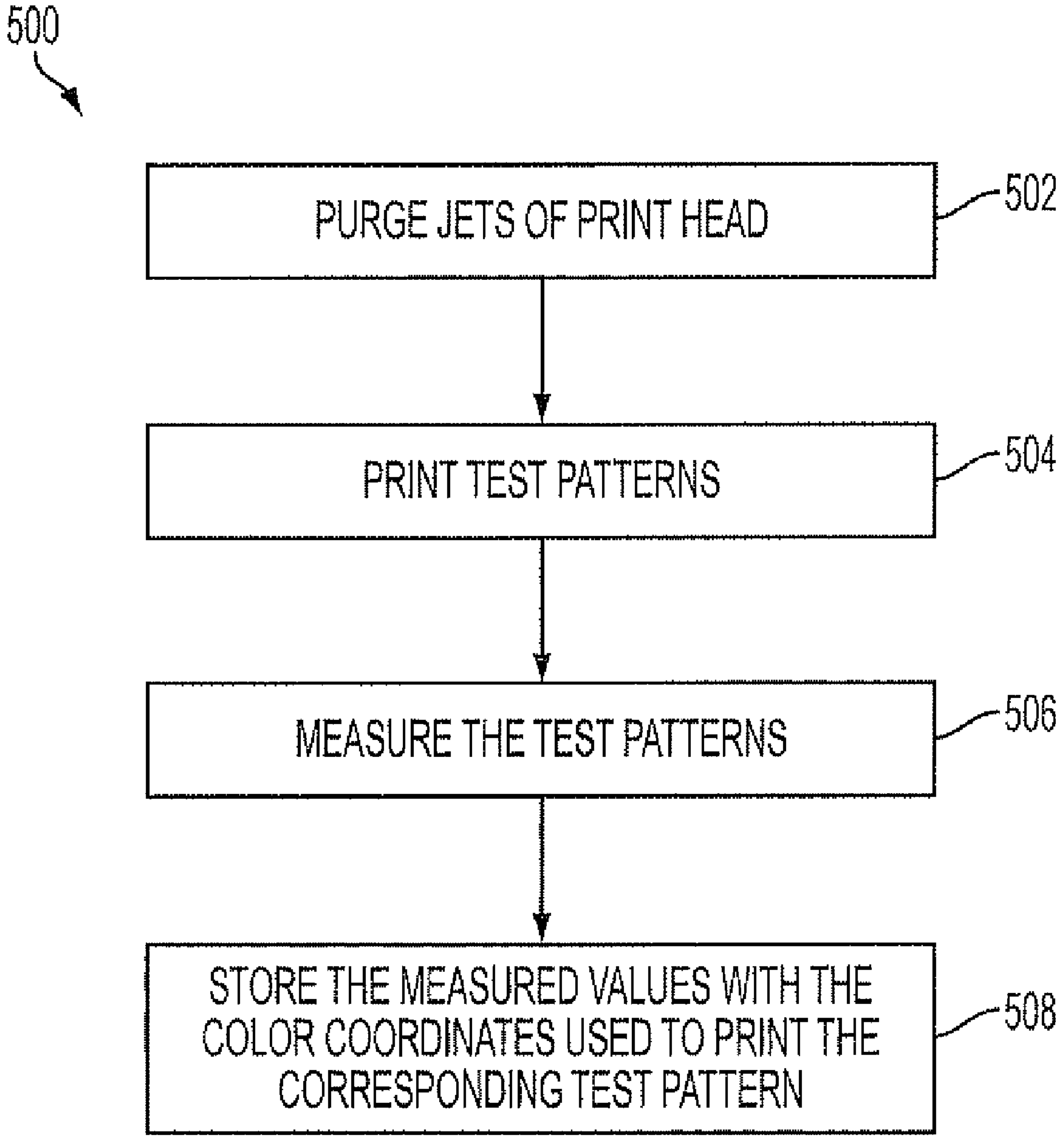
FIG. 5 is a flowchart of one method of generating a correspondence table.

FIG. 5 is a flowchart of a method 500 for implementing step 402 of FIG. 4. At step 502, the jets of print head 302 to be used in printing the test patches are purged. When a jet 304 is purged, it is cleared of obstructions and, thus, ensures that the purged jets 304 are in proper operating states. At step 504, test patches or patterns are printed for each point in the correspondence table. For example, as described above, test patches can be printed for a plurality of test patch color coordinates produced by varying each color coordinate by predetermined intervals.

At step 506, the test patterns are measured by the sensor 218. When the sensor 218 is a monochromatic sensor, each pixel will have a measured value that is a gray level value. When the sensor 218 is a color sensor, each pixel will have a measured value that is a combination of a plurality of color component values. For example, sensor 218 as a color sensor could output a set of values in the Lab color space, CMYK color space, or any other applicable color space. At step 508, the measured values are stored with the test patch color coordinates that were used to produce the corresponding test pattern. The correspondence table comprises all the stored test pattern color coordinates and corresponding measured gray scale values or sets of color values.

Steps 504, 506 and 508 are generally performed in an overlapping manner. That is, generally a test patch will be measured right after it is printed, possibly before at least some other test patches are printed. For example, sensor 218 may be directly mounted to print head 302 so as to sense the printed output immediately after the color image (test patch) is printed. Further, once a test patch is measured, the measured value or values will be stored with the corresponding color coordinates used to produce the test patch by correspondence table generation unit 240, possibly before at least some other test patches are printed. Generally, method 500 can be performed before, or between print runs of the printer 100, but generally can not be done during a print run without interrupting the print run.

Figure 6:
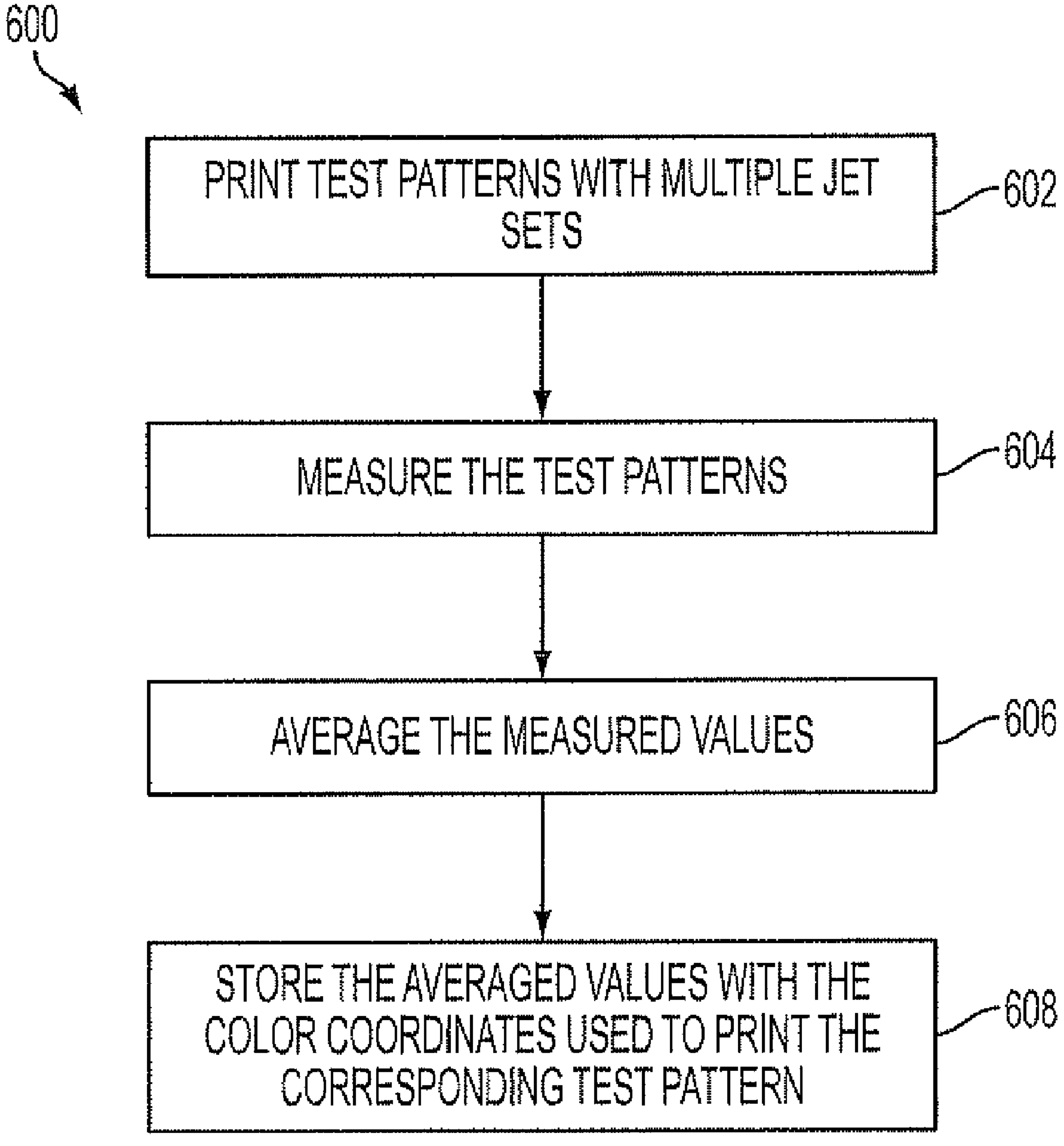
FIG. 6 is a flowchart of a second method for generating a correspondence table.

FIG. 6 is a flowchart of another method 600 for implementing step 402 of FIG. 4. In this method, at step 602, test patterns are printed. The test patterns can be chosen and generated as described above in relation to step 504. However, because the print head 302 is not purged in method 600, it is possible that any number of jets 304 could be dysfunctional or non-operable. To compensate for the fact that some unknown jets 304 might be dysfunctional or non-operable, each test pattern is printed by multiple jet sets of the print head 302. That is, test patterns resulting from identical test pattern color coordinates are printed by multiple jet sets. Which jet sets are used to print the test patterns can be predetermined, or chosen randomly. However, it is preferable that the jet sets used to print the test patterns are varied with each different set of test patch color coordinates used to print test patches. The number of test patches produced for each point in the correspondence table can be a predetermined number, such as 10. In variations, a larger or smaller number can be used, as desired.

In step 604, the test patterns are measured, as in step 506. Thus, a plurality of gray scale values, if sensor 218 is monochromatic, or a plurality of color component value sets, if sensor 218 is a color sensor, are produced for each set of color coordinates used to produce the test patterns. In step 606, if the sensor 218 is monochromatic, the gray scale values for all test patterns printed from a same set of color coordinates are averaged. For example, if printer 100 uses a CMYK color system and a test pattern of C=70, M=100, Y=20, and K=40 is used to print test patterns with four different jet sets and the respective test patterns are measured to produce the gray scale values of 25, 26, 23 and 44, the averaged value is 29.5. Similarly, if the sensor 218 is a color sensor, a value will be output for each color sensed by the sensor 218. In this case, for each color of the sensor 218, the measured color values for all the measured test patterns printed using the same set of test pattern color coordinates are averaged, producing a set of averaged color sensor values. At step 608, the averaged values are stored with the test patch color coordinates used to produce the corresponding test pattern. The correspondence table includes all test pattern color coordinates and corresponding averaged gray level values or sets of averaged color values.

Method 600 can be performed before or between print jobs or can be performed by interrupting a print job. Furthermore, according to one embodiment, a correspondence table can be generated during normal operation of the printer 100, that is, during a production run in which a user's print job is being printed by determining the test patch color coordinates for all desired points in the correspondence table during the print job. Because all desired test patch color coordinates may not be printed by a sufficient number of jet sets in images of a production run to produce a valid point in the correspondence table, the system records the measured values for all color coordinates within a predetermined threshold (range) of a desired point to be measured. For example, the predetermined threshold of a desired point could be, for each color coordinate, at most + or −2 from the corresponding color coordinate of a desired point in the correspondence table. In variations, other threshold values can be used. Further, different threshold values can be used for different colors of a point in the correspondence table. Thus, for each desired point in the correspondence table, data is accumulated for a candidate set of color coordinates each of which is within the predetermined threshold of the desired point.

Once sensor outputs have been obtained and stored for a candidate set of color coordinates over a predetermined number of jet sets, the sensor outputs are averaged and stored with the corresponding color coordinates. The predetermined number of values is chosen to minimize the effects of possible faulty jets. For example, the predetermined number can be 50, but can be smaller or larger as desired. In variations, further accumulation of data regarding any candidates for the corresponding desired point in the correspondence table is halted. In other variations, data is continued to be accumulated for those candidate color coordinates closer to the desired point in the correspondence table. The measure of closeness used can be mean squared error (MSE) or any other desired measure of closeness. Once the number of data points for a closer candidate reaches the predetermined number (e.g., 50), the data points can be averaged and used to replace the previously stored entry in the correspondence table corresponding to the desired point. In variations, the new correspondence table entry can be added with the old entry being retained, resulting in two or more closely located points in the correspondence table.

In further variations, the averaging of sensor output values can be postponed until data for a sufficient number of points in the correspondence table have been accumulated. For example, the threshold at which a sufficient amount of data has been accumulated could be when the color space region covered by the stored data covers 90% of all the colors occurring in the print run from which the data is being extracted. In variations, different measures of when sufficient data has been accumulated can be used. Once a sufficient amount of data has been determined to have been collected, then the data for each point call be averaged as discussed above. While a complete correspondence table may not be produced using user-produced images printed in normal operation (instead of test patches), such a correspondence table can be used to determine missing jets.

Returning to the method 400 of FIG. 4, after the correspondence table has been generated and stored, the correspondence table can be used to determine whether there are any faulty jets during a standard production run in which user-provided images are printed. The ability to detect faulty jets during a standard production run means that the production run does not need to be periodically halted: (1) to perform a special test for faulty jets (for example using specialized test patterns); or (2) to perform jet purging at predetermined times, for example, to avoid jets clogging and becoming faulty. Rather, faulty jets can be detected during the standard production run (using virtually any image that the user is printing), and corrective measures such as purging can be performed only when needed (that is, only when faulty jets are detected).

Thus, at step 404, printed output is measured at multiple locations for each jet set as a part of the normal operation of printer 100 (that is, during printing of user-provided images). The multiple locations can be selected so as to be at predetermined intervals in the user's image and/or at pixels in the user's image for which the input color coordinates meet a predetermined criteria. For example, the predetermined criteria could be a set of color coordinates for which each color value is in the range 20-235, for a color space having a range of color coordinates of 0 to 255. However, other thresholds or ranges, greater or lower, can be used. Further, different thresholds or ranges for different color coordinates can be used.

At step 406, for each measured location in the printed output of the user's image, the color coordinates of the image corresponding to the measured locations are used to determine predicted sensor outputs from the correspondence table. For each measured location, a set of predicted sensor outputs is generated over multiple possible operating state configurations for the corresponding jet set. Specifically, each jet 304 of a jet set hypothetically can have multiple different possible operating states from operating normally to failing to operate. A jet 304 fails to operate, for example, if the jet 304 ejects no ink regardless of the input value for that jet. In one embodiment, the jets 304 of printer 100 are modeled as having one of two possible operating states—either operating normally or failing to operate. Alternatively, additional or other states can be used, such as a state in which X % of normal operation is achieved, where X can be any desired percentage, such as 50.

A complete set of possible operating state configurations for a jet set includes all possible configurations that result by varying the operating state for each jet 304 of the jet set over all possible operating states for the jets 304. For example, if a jet set has four jets and the possible operating states for each jet are normal operation and failing to operate, all possible operating state configurations for the jet set includes (1) all jets operating normally; (2) a first jet failing to operate and all other jets operating normally; (3) a second jet failing to operate and all other jets operating normally; . . . (16) all jets failing to operate. That is, the maximum number of possible operating state configurations for a jet set is given by the equation:

$$m^n \tag{1}$$

where m is the number of operating states and n is the number of jets in a jet set.

However, in variations, all possible operating state combinations for every jet set do not have to be calculated in step 406, as discussed more fully hereafter.

Once a set of possible operating state configurations for a measured location is determined, the correspondence table is used to predict the measured sensor value (or values for a color sensor) for each of the possible operating state configurations.

For those input color coordinates that do not match with a point in the correspondence table, the predicted sensor values are calculated by interpolation, using points in the correspondence table. For example, a predicted sensor value can be calculated by using the n nearest neighbors of the input color coordinates. For a color sensor having k outputs, an interpolated predicted sensor output is produced for each of the k outputs.

The nearest n neighbors for a set of input color coordinates can be found, for example, by finding the n points in the correspondence table which result in minimum values for the equation:

$$MSE = \frac{1}{k}\sum_{j=1}^{k}(x_j - y_j)^2 \tag{2}$$

where k is the number of colors in the color space of the correspondence table; $x_j$ is the value of the jth color coordinate of a closest neighbor candidate, and $y_j$ is the jth color coordinate of the input color coordinates. However, any other suitable method for detecting the nearest neighbors can be used.

At step 408, once the predicted sensor value or values have been determined that correspond to each possible operating state configuration for a jet set, the best match from the possible operating state configurations with the actual measured value or values is determined.

In one embodiment, for a monochromatic sensor, the best match algorithm used includes finding the closest match by minimizing mean squared error, such as by the equation:

$$MSE_i = \frac{1}{N}\sum_{j=1}^{N}(x_j - y_{ij})^2 \tag{3}$$

wherein $x_j$, j=1 to N, is the measured value at the jth location, collected over customer page(s), for a jet set; N is the total number of locations measured for this jet set; $y_{ij}$, i=1 to m and j=1 to N, is the predicted measured value for the ith possible operating state configuration and the predicted value at the jth location of the above corresponding customer page(s) for the jet set; and m is the number of possible operating state configurations for the jet set.

In another embodiment, a "majority votes" best match algorithm is used, majority votes, is given by:

$$V_i = \sum_{j=1}^{N} v_{ij} \quad (4)$$

wherein $$v_{ij} = 1 \text{ if } |x_i - y_{ij}| = \min_{k=0to15}(|x_i - y_{ik}|)$$

and 0 otherwise. The largest $V_i$ is the best match.

In another embodiment, the best match algorithm used can be other distance measures such p-norm. For example, similar to MSE as defined in equation (1), one can define the distance $D_i$ as $$D_i = \frac{1}{N}\left(\sum_{j=1}^{N}(x_j - y_{ij})^p\right)^{1/p};$$

and the i that gives minimal $D_i$ is the best match.

EXAMPLE 1

FIG. 7 shows a Table 1 of a first example of the application of method 400. In this example, a printer 100 having a four color (CMYK) color space and a monochromatic sensor 218 was used. The correspondence table that characterized the relationship between the printed color image and the monochromatic sensor output for this example was generated in accordance with step 402. Table 1 shows a database that includes data generated in the printing and measuring of one or more images (columns 1-7) and predicted operating state configuration data (columns 8-23). Thus, Table 1 includes spatial location data (columns x and y); intended CMYK data to be printed at the locations (columns c, m, y, and k); measured gray-levels (column g), and predicted gray-level values for the possible operating state configurations (columns g0-g15). The CMYK data (the intended color data) in columns C, M, Y and K comes from the data of the user's image at various locations in the image (selected by varying the values of x and y). The values for columns g0-g15 are determined (predicted) by using the previously determined correspondence table in conjunction with the intended color data (of columns c, m, y and k) and varying the operating state configuration (between properly operating and failing to properly operate) for each jet, so as to calculate different possible predicted outputs of the monochromatic sensor. The measured gray level column is the actual monochromatic sensor output at the specified x, y location of the printed user's image. Because streaks occur in the process direction, an averaging window was used along the other direction (y) when collecting the data to reduce the impact of noise. The predicted operating state configuration data was generated for all possible operating states of the jets for this system. Because the imaging device is a CMYK device, there are 16 possible operating states of the jet sets of the imaging device (columns 8-23).

For each spatial location corresponding to a set of CMYK jets (four jets, one for each of C, M, Y, and K), a classification step (faulty or not) in accordance with step 408 was applied based on how well the measured gray-levels matched the predicted gray-levels. That is, column g in Table 1 was compared to columns g0~g15 to find the "closest match". As described above, a measure such as MSE, majority votes, etc., can be used for selecting the closest match.

In Table 1, the first seven columns (the x and y values of the spatial location, the C, M, Y and K input color coordinate values, and the sensor output in column g) are based in the printed user images (either input data used to generate the image or sensor data obtained by sensing the printed user image). In this example, the location x corresponds to the jet set being monitored. No information for jet sets 2-9 are available since they were "not used" in this particular jobs. Thus it would not be possible to identify the operating states for any of the jets for jet sets 2-9 because there is no data to analyze for these jet sets. Based on the predetermined relationship between printed color image and monochromatic sensor output, CMYK to gray scale level, multiple possible output state configurations for each location were generated, as in step 406. The results are shown in columns 8~23, g0-g15, which correspond to the predicted gray scale levels for all 16 possible jet operation state configurations, modeling the operating states of each jet as either operating properly or failing to operate. That is, the possible operating state configurations of the jet set are: in g0, no jets are faulty; in g1, the C jet is faulty; in g2, the M jet is faulty; in g3, the Y jet is faulty; in g4, the K jet is faulty; in g5, the C and M jets are faulty; in g6, the C and Y jets are faulty; in g7, the C and K jets are faulty; g8, the M and Y jets are faulty; in g9, the M and K jets are faulty; in g10, the Y and K jets are faulty; in g11, the C, M, and Y jets are faulty; in g12, the C, M, and K jets are faulty; in g13, the C, Y, and K jets are faulty; in g14, the M, Y, and K jets are faulty; and in g15, all jets are faulty.

As an example, g0 (for the condition where all of the jets, CMYK, of a jet set are working properly) was obtained by passing the intended CMYK values (columns 3~6) through the predetermined relationship between printed color image and monochromatic sensor output. As another example, g1 (for the condition where the cyan (C) jet of a jet set is faulty while the M, Y, and K jets are working properly) is obtained by setting the value for cyan (C) to zero (C=0) and keeping the values for M, Y, and K as is (in columns 4-6) and then passing the values of them through the predetermined relationship. As would be expected, if all of the C, M, Y, and K jets are on, the measured g should be closest to, if not identical, to g0 in the image portion corresponding to jet set 1 (Section A in Table 1). Similarly, if in jet set 10 a cyan (C) jet is faulty but the other jets operate properly, the measured g should be closest to g1 in the image portion that corresponds to jet set 10 (Section B in Table 1).

Note that small noises appear in the measured gray level column. In this example, it is possible that a misclassification may occur for jet set 10 as containing a magenta (M) jet that is faulty rather than a cyan (C) jet that is faulty because g1 and g2 for jet set 10 are very close in the data set in this example. This shows that (1) further data screening would help improving classification accuracy and (2) a more capable sensor, such as an RGB sensor, would also help resolve such confusion. When an intended set of input coordinates CMYK has a zero value, such as for K, this particular data would provide no information about whether the K-producing jet is faulty (if a color is not part of an image sample, it is not possible to detect if the jet for producing that color is faulty). To eliminate the possibility of using such unhelpful parts of the user image, one can set a threshold η (say 20%) to pre-screen (and not use) data that provides no information for faulty jet detection.

EXAMPLE 2

Figure 8:
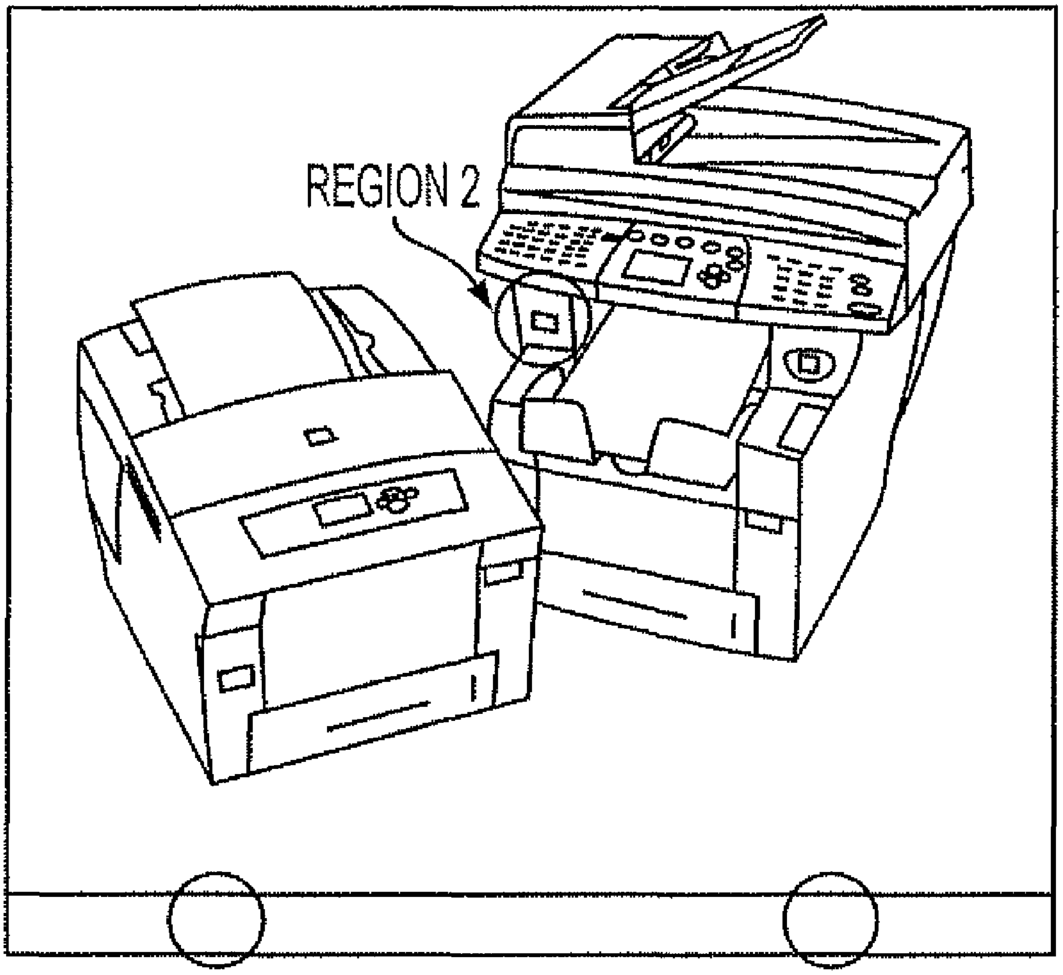
FIG. 8 is a document image for an example 2.

FIG. 8 shows a page of a document 802 that illustrates the effectiveness of the disclosed methods in a second example. In this example, document 802 was printed using a Phaser8560 printer having a monochromatic sensor. Three jet failures were simulated in document 802. Document 802 was also simulated to include noises such as simulated printer noises, sensor noises, etc. The three jet failures simulated were: the magenta (M) jet in the jet set 1000 in the simulation, the cyan (C) jet in the jet set 2600 in the simulation, and the jets corresponding to magenta (M) and yellow (Y) in the jet set 4000 in the simulation.

Figure 9A:
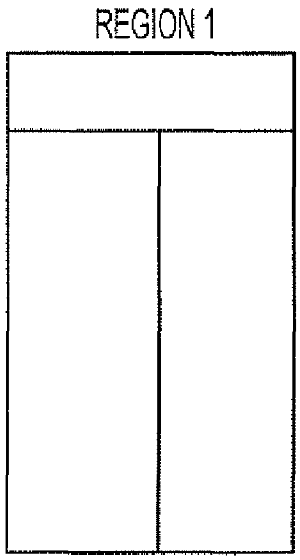
FIGS. 9*a*-9*c* are close ups of different regions in the document image of FIG. 8.
Figure 9B:
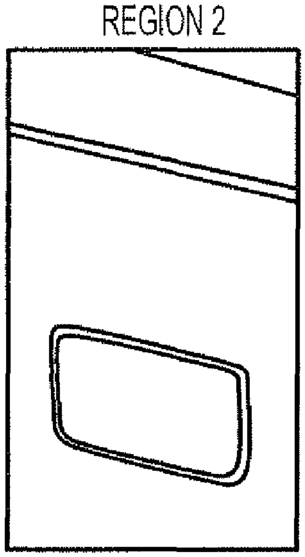
Figure 9C:
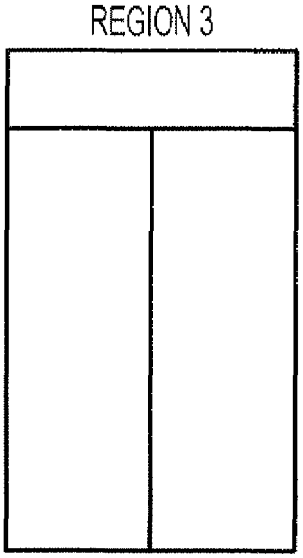

FIGS. 9*a*-9*c* show close ups of areas of document 802 in which failures are evident. Visually, it is very easy to identify the missing/faulty jets in this example by comparing the known, intended color against the color observed. Thus, implementation of the disclosed methods by a color sensor, such as an ROB sensor, would be successful and thus will not be discussed here. As discussed above, however, a monochromatic sensor was used in some applications/printers. As a further confirmation of the benefits of the disclosed methods, the faulty-jets in this example were identified using image regions that are not dominated by any of the colors of the imaging device color space, as would be required in other methods.

In this experiment, the CMYK to gray scale output relationship between the output space of the Phaser8560 solid-ink jet printer and the gray scale level sensor output of the monochromatic sensor was determined by printing a randomized set of 1617-patch targets, where the CMYK combinations are the same as those defined in IT8 7/4 standard, as in step 504, that were then scanned by the monochromatic sensor, as in step 506. This resulted in a correspondence table which represents the relationship between color printed image and monochromatic sensor output.

Images were generated and measured, as in step 404, by the monochromatic sensor using a 100-pixel window size averaging in the process direction while preserving the sensor resolution at 600 DPI in the process-perpendicular direction. This corresponds to a sensing with 6 DPI in process direction and 600 DPI in process-perpendicular direction. Note that as indicated earlier, process-perpendicular direction relates to the jet locations and thus preferably want to have high resolution in the sensing. The purpose of averaging in the process direction is to reduce sensing and printing noises that are not relevant to defects due to missing jets. This is optional. For an 8.5 inches document width (times 600) in the process-perpendicular direction, this corresponds to 5100 measured locations that can be used for identifying missing jets. Predicted sensor values were generated for each measured location, as in step 406. The possible operating states for all jets were chosen as operating properly and failing to operate. In this example the printer color space is CMYK. Thus there are four jets to each jet set, yielding a total of 16 different possible operating state configurations for each jet set. The predicted sensor values of the possible operating state configurations were compared with the measured sensor output for each of the multiple locations, as in step 408, to determine the best match. The MSE algorithm was used as the measure of closeness in this example.

Figure 10:
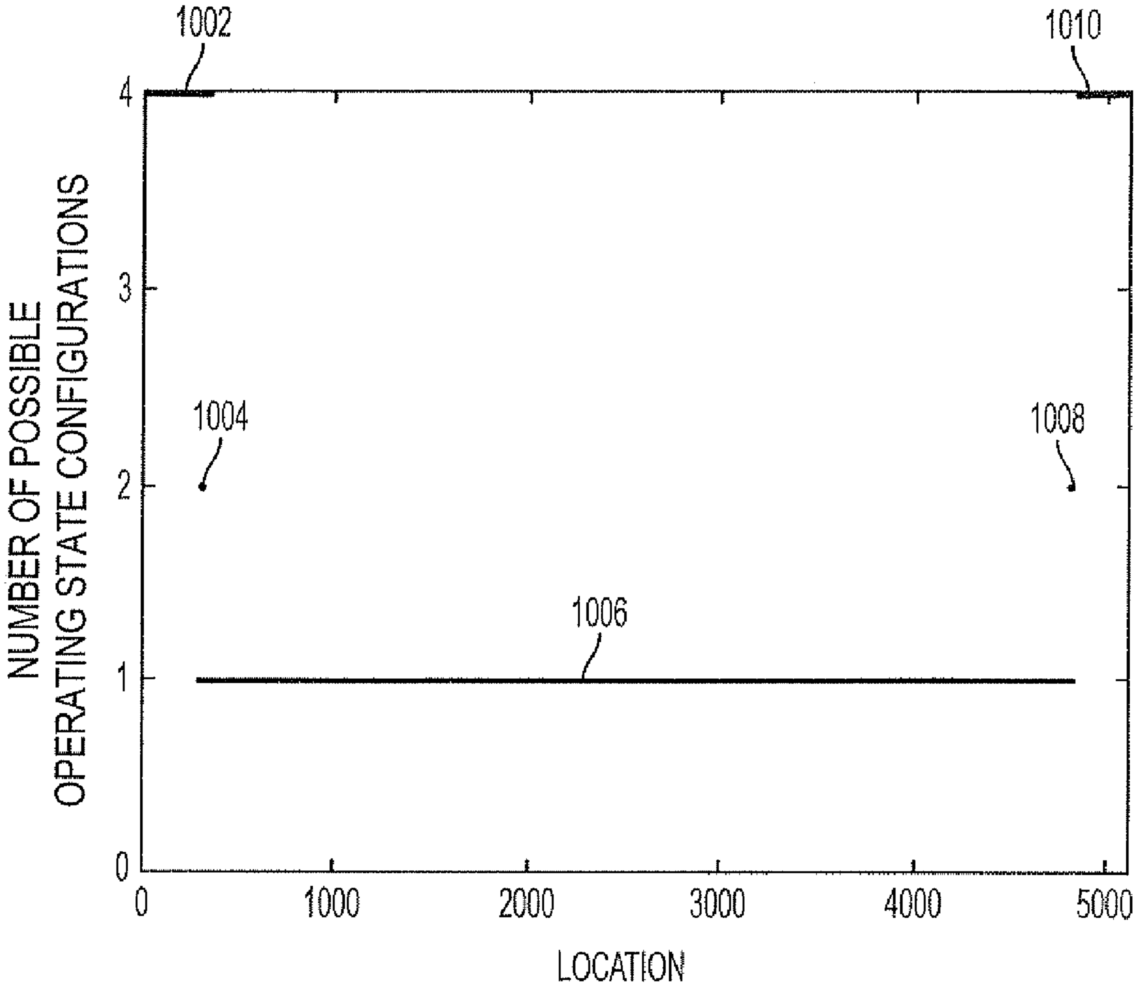
FIG. 10 is a graph showing the number of g's that yield a minimal MSE vs. jet location for example 2.
Figure 11:
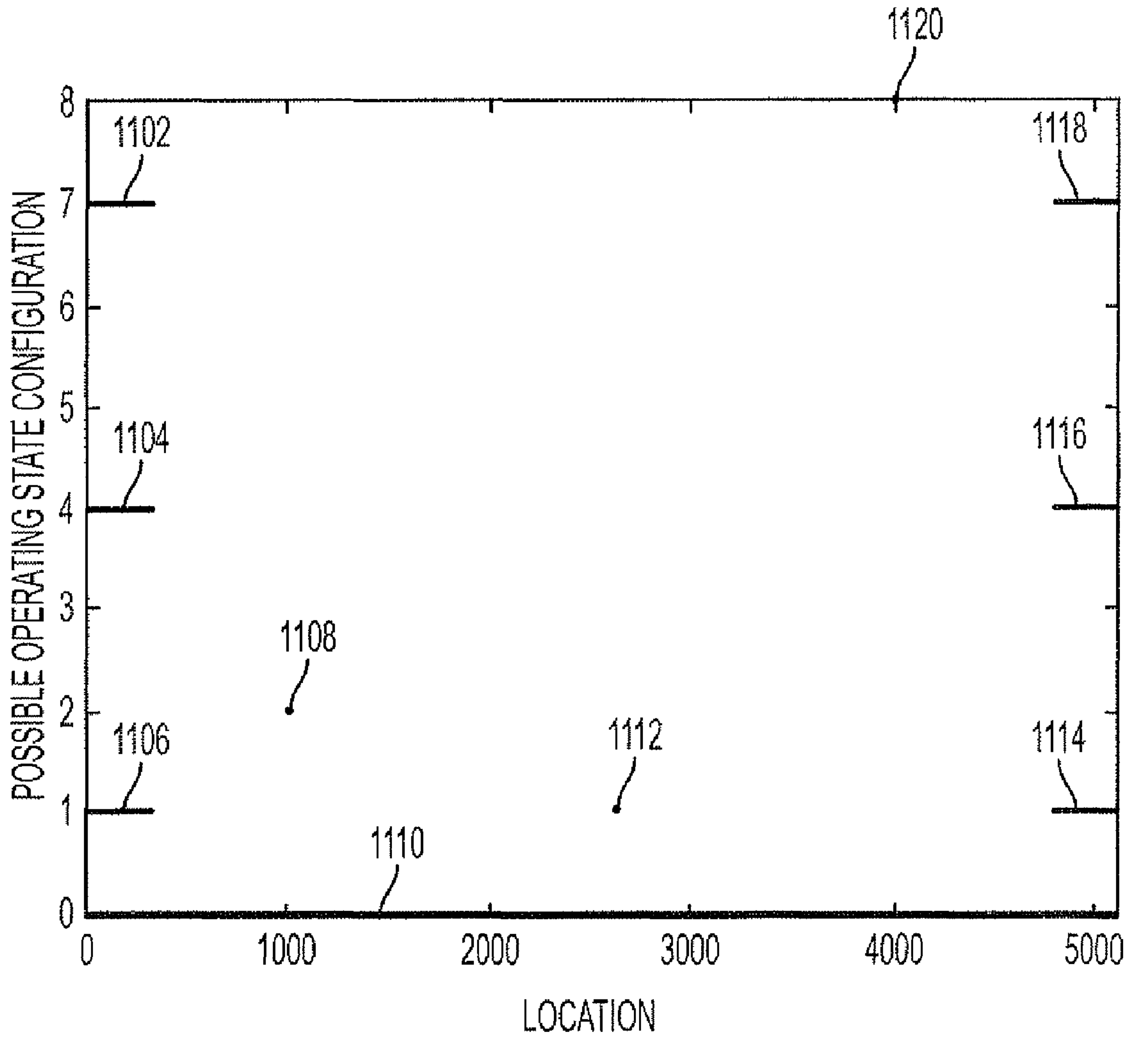
FIG. 11 is a graph showing the results of faulty jet identification for example 2.

FIGS. 10-11 show the results. FIG. 10 shows the number of predicted gray levels that yield the minimal MSE for each of the 5100 locations. Ideally, there is only one predicted gray level meeting this criteria, which should correspond to the actual state of the jet set. In a case where more than one predicted gray level has the minimal MSE (for example, g0 and g1), the indeterminacy is due to insufficient data collected from the image. That is, in a case where the MSE for g0 and g1 are both minimal, cyan likely is not sufficiently requested in that location. Thus there is no way to tell whether the C-jet is working properly or is faulty. In FIG. 10, line 1002 and point 1004 show minimum MSEs for locations 0 to 300, line 1006 (g1) shows the minimum MSE for locations 301 to 4750, and point 1008 and line 1010 show the minimum MSEs for the locations 4751 to 5050. Notice that at location 0 to 300 (1002, 1004) and location 4751 to 5050 (1008, 1010) there are more that one predicted gray levels that yield the minimal MSE. Further discussion will be presented hereafter. This is due to an insufficient data gather from customer images, which can be resolved by sensing more customer pages than those in this simulation.

As shown in FIG. 11, at the left-most and right-most 0.5 inch, the disclosed algorithm was confused between g0 (1110, no jets are faulty), g1 (1106, the C jet is faulty), g4 (1104, the K jet is faulty), and g7 (1102, both the C and K jets are faulty). This is because the image has blank margins at those regions. Due to this insufficient data collected from the image for C and K at these margins, the algorithm can only narrow it down to those 4 possibilities. For the rest of the locations, the algorithm correctly determines the jet set operating state.

FIG. 11 is a graph showing the g's that yield the minimal MSE. FIG. 11 shows that, other than in the 0.5 inch margins at the left and fight where the algorithm narrows the possible faulty jets down to 4 possibilities, g0 (line 1110), g1 (lines 1106 and 1114), g4 (lines 1104 and 1116), and g7 (lines 1102 and 1118), the operation states of the rest of the jets were identified correctly. That is, all jets are determined to be functioning properly (g0), except that for the jet set 1000, the M-jet is determined as faulty (g2, point 1108), for jet set 2500, the C-jet is determined as faulty (g1, point 1112), and for the jet set 4000, both the M and Y jets are determined as missing (g8, point 1120).

Tiered Algorithm

Figure 12:
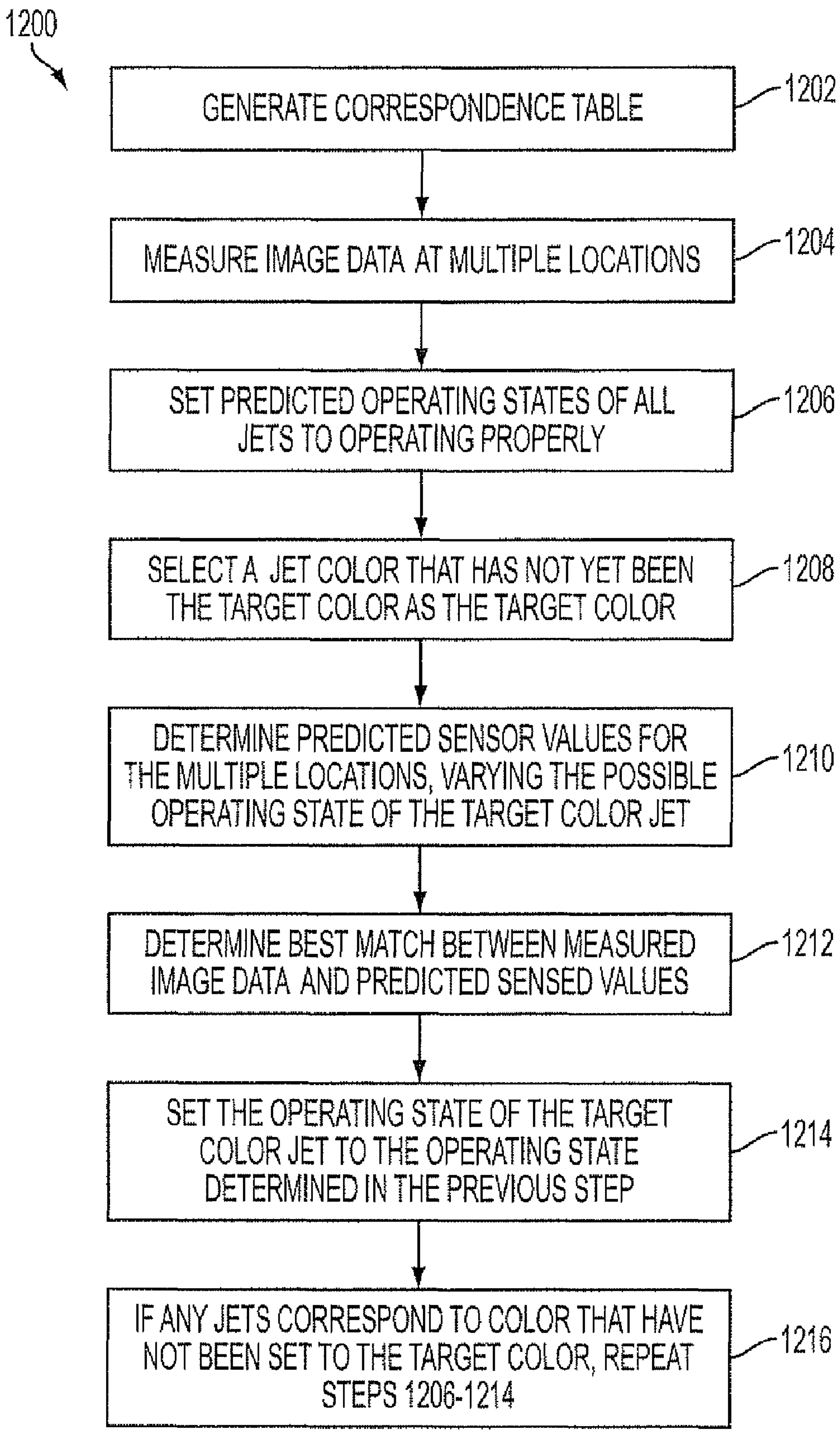
FIG. 12 is a flow chart of another method for monitoring jets in an imaging device.

FIG. 12 shows a flowchart of a tiered algorithm 1200 that can be used to determine, for one jet color at a time, whether one or more jets are faulty. At step 1202, a correspondence table is generated according to any of the methods disclosed herein. At step 1204, the processor 222 interacts with the controller 232 and the sensor interface unit 234 to measure image data output by the printer 100 at multiple locations of at least one jet set having one jet 304 for each of the plurality of colors in the printer color space. In step 1206, the processor 222 sets a predicted operating state to operating properly for each jet 304 of the at least one jet set. At step 1208, the processor 222 selects a color of the plurality of colors that has not yet been set as a target color to be set as the target color. For the initial pass through method 1200, all of the colors of the printer color space will not have been set as the target color, so any of the colors can be selected. One method for selecting the order of colors to be used as the target color is to randomly select the colors.

As another method, the measured sensor values for at least one location for each monitored jet set can be compared to the color coordinate values used to produce the measured image portion and an estimation made as to the more likely to be faulty. For example, one location for each jet set being monitored could be analyzed according to method 400 to determine an order of jets 304 in decreasing likelihood of being faulty. For example, the possible operating state combinations for the jets 304 of a jet set can be ordered according to how good their corresponding predicted sensor values match with the measured sensor values for that location, from best match to worst match. Then, starling with the best match, the operating state combinations can be checked in order, starting with the best match combination. The jets 304 identified as faulty in the first combination to predict any faulty jets will be set as the target color before any of the other colors. If two or more jets 304 are first predicted as faulty in a same combination as the order of combinations is traversed, the jet 304 of the two jets 304 that is first again predicted as faulty in a succeeding combination as the order of combinations is traversed is set to the target color before the other color of the two.

In step 1210, the prediction unit 236 calculates predicted sensor values for multiple locations for the jet group using the predicted operating states for all the jets having colors that are not the target color and, for the target color jet, using the predicted operating states of, alternately, (i) operating properly and (ii) faulty. In step 1212, the judgment unit 238 determines whether the jet 304 of the target color is operating properly or is faulty by comparing the predicted sensor values with the actual sensor values for the multiple locations.

In step 1214, the processor 222 sets the operating state of the target color jet according to the results of the judgment unit 238. In step 1216, provided at least one color of the color set of the printer 100 has not been set as the target color, the processor 222 controls the system to repeat steps 1204-1214.

It will be appreciated that various of the above-disclosed and other features and functions, or alternatives thereof, may be desirably combined into many other different systems or applications.

What is claimed is:

1. A method of monitoring jets of a color imaging device, the jets respectively outputting inks of different colors, the imaging device including a monochromatic sensor that senses images output by the imaging device, the method comprising:

generating a correspondence map between an output color space of the jets and an output gray scale space of the monochromatic sensor;

measuring actual gray scale values of an image output by the imaging device at multiple locations, the image generated from actual image data;

calculating predicted gray scale values of the monochromatic sensor for each of the multiple locations, the predicted gray scale values for each of the multiple locations including predicted gray scale values for multiple different possible operating configurations of the jets, wherein each jet can have an operating state of (i) properly operating or (ii) faulty, the different operating configurations comprising different combinations of properly operating and faulty jets for a predetermined group of the jets, each jet of the predetermined group outputting a different one of the different colors; and determining whether the jets are (i) operating properly or (ii) faulty, by comparing the measured actual gray scale values of the multiple locations with the corresponding predicted gray scale values for each of the multiple locations.

2. The method of claim 1, wherein, in the step of generating a correspondence map, the correspondence map is generated based on sensing at least one test patch output by the imaging device.

3. The method of claim 1, wherein the step of generating a correspondence map includes:

purging all the jets of at least one group of jets comprising one jet of each of the different colors;

printing a plurality of test patches by the purged at least one group of jets, each of the test patches being printed from a different set of test patch color coordinates;

sensing the test patches by the monochromatic sensor to generate corresponding gray scale values; and storing the sensed gray scale values each with the test patch color coordinates used to print the corresponding test patch.

4. The method of claim 1, wherein the step of generating a correspondence map includes:

printing a plurality of test patches by a plurality of jet groups each comprising one jet for each of the different colors, each test patch being printed from a set of test patch color coordinates, each set of test patch color coordinates being printed by multiple jet groups of the plurality of jet groups;

sensing the test patches by the monochromatic sensor, the monochromatic sensor outputting sensed gray scale values;

averaging the sensed gray scale values for test patches printed by different jet groups from a same one of the sets of test patch color coordinates to generate averaged gray scale values; and storing each set of test patch color coordinates used to print the test patches with the corresponding averaged gray scale value.

5. The method of claim 1, wherein, in the step of determining whether the jets are (i) operating properly or (ii) faulty, the determination is made based on a best match between the measured actual gray scale value and the corresponding predicted gray scale values for each of the multiple locations.

6. The method of claim 1, wherein the step of determining includes determining, for each of the multiple locations, which operating configuration has a predicted gray scale value having a best match with the corresponding actual measured gray scale value.

7. The method of claim 6, wherein a determination of whether any jets are faulty is carried out at predetermined intervals.

8. The method of claim 1, further comprising:

performing a cleaning/purging operation if one or more jets is determined to be faulty.

9. A method of monitoring jets of a color imaging device, the jets respectively outputting inks of different colors, the imaging device including a multichromatic sensor that senses images output by the imaging device, the method comprising:

generating a correspondence map between an output color space of the jets and an output color space of the multichromatic sensor;

measuring actual color values of an image output by the imaging device at multiple locations, the image generated from actual image data;

calculating predicted color values of the multichromatic sensor for each of the multiple locations, the predicted color values for each of the multiple locations including predicted color values for multiple different possible operating configurations of the jets, wherein each jet can have an operating state of (i) properly operating or (ii) faulty, the different operating configurations comprising different combinations of properly operating and faulty jets for a predetermined group of the jets, each jet of the predetermined group outputting a different one of the different colors; and determining whether the jets are (i) operating properly or (ii) faulty, by comparing the measured actual color values of the multiple locations with the corresponding predicted color values for each of the multiple locations.

10. The method of claim 1, further comprising:

(1) setting a predicted operating state to properly operating for each jet of a jet group having one jet for each of the different colors;

(2) selecting a color of one of the jets of the jet group that has not previously been set as a target color to be the target color, the step of calculating including calculating predicted gray scale outputs for the multiple locations for the jet group wherein the predicted operating state of the jet of the target color is alternately (i) operating properly and (ii) faulty, the step of determining including determining whether the jet of the target color is operating properly or is faulty by comparing the predicted gray scale outputs with the actual gray scale outputs for the multiple locations;

(3) setting the predicted operating state of the jet of the target color according to the results of the step of determining; and (4) when at least one of the colors of the jets of the jet group has not been set as the target color, repeating steps (2)-(4).

11. A system for monitoring jets in a color imaging device, the jets each corresponding to different ones of a plurality of colors of the color imaging device, the system comprising:

a sensor that senses images and outputs actual gray scale values;

a memory storing a correspondence map between an output color space of the jets and an output gray scale space of the sensor;

a processing device comprising:

a sensor controlling unit that controls the sensor to measure printed output of the color imaging device at multiple locations in the printed output and to output corresponding actual gray scale values, a prediction unit that calculates predicted gray scale values of the sensor for each of the multiple locations, the predicted gray scale values for each of the multiple locations including predicted gray scale values for multiple possible operating state configurations of the jets wherein each jet can independently have the operating states of properly operating and faulty, and a judgment unit that determines, for a predetermined group of jets having jets each of which corresponds to a different one of the plurality of colors, the operating states of the jets based on the predicted gray scale values and the actual gray scale values for the multiple locations.

12. The system of claim 11, wherein the processing device further comprises:

a correspondence table generation unit that controls jets of the printer to produce test patches from test patch color coordinates and stores each of the test patch color coordinates in association with the corresponding actual gray scale value output by the sensor.

13. The system of claim 11, further comprising:

an interface that allows a user to specify which jets are to be monitored.

14. The system of claim 11, further comprising:

a display that indicates the determined operating state for at least one jet.

15. The system of claim 11, wherein the judgment unit determines the operating states of the jets based on a best match between the measured actual gray scale values and the corresponding predicted gray scale values for each of the multiple locations.

16. The system of claim 15, wherein the best matches are determined by at least one of a minimum mean squared error and a minimum p-norm error between the actual gray scale values and the corresponding predicted gray scale values for the multiple locations.

17. The system of claim 11, wherein the monitoring of the jets is carried out at predetermined intervals.

18. The system of claim 11, wherein the processing device:

(1) sets a predicted operating state to properly operating for each jet of a jet group having one jet for each of the plurality of colors;

(2) selects a color of the plurality of colors that has not yet been set as a target color to be set as the target color, the predication unit calculating predicted gray scale values for the multiple locations for the jet group wherein the predicted operating state of the jet of the target color is alternately (i) operating properly and (ii) faulty, the judgment unit determining whether the jet of the target color is operating properly or is faulty by comparing the predicted gray scale values with the actual gray scale values for the multiple locations;

(3) sets the operating state of the jet of the target color according to the results of the judgment unit; and (4) when at least one color of the plurality of colors has not been set as the target color, repeats functions (2)-(4).

19. The system of claim 11, further comprising:

a controller that causes jets determined to be faulty to be purged.

20. A xerographic device including the system of claim 11.

* * * * *